United States Patent [19]
Spidell et al.

[11] 3,776,323
[45] Dec. 4, 1973

[54] SYSTEM FOR OPERATING AN ELECTRICAL DEVICE AND A SELECTIVELY FIRED PERFORATOR UTILIZING A COMMON TRANSMISSION CHANNEL

[75] Inventors: William H. Spidell; Billy F. Wilson, both of Houston, Tex.

[73] Assignee: Dresser Industries, Inc., Dallas, Tex.

[22] Filed: May 11, 1972

[21] Appl. No.: 252,442

[52] U.S. Cl. .............................. 175/4.51, 166/66
[51] Int. Cl. ............................................. E21b 43/119
[58] Field of Search .......................... 175/4.51, 4.55; 166/55.1, 65, 66

[56] References Cited
UNITED STATES PATENTS

| | | | |
|---|---|---|---|
| 2,338,872 | 1/1944 | Robidoux | 175/4.51 X |
| 2,349,041 | 5/1944 | Hare | 175/4.51 X |
| 2,768,684 | 10/1956 | Castel et al. | 175/4.51 |
| 3,019,841 | 2/1962 | Ternow | 175/4.51 |
| 3,126,964 | 3/1964 | La Rue | 175/4.55 |
| 3,172,360 | 3/1965 | Dewan | 175/4.51 |
| 3,246,707 | 4/1966 | Bell | 175/4.55 X |
| 3,327,791 | 6/1967 | Harrigan | 175/4.55 |
| 3,342,275 | 9/1967 | Mellies | 175/4.51 |
| 3,550,695 | 12/1970 | Shore | 175/4.51 |

*Primary Examiner*—David H. Brown
*Attorney*—Robert M. Mayer et al.

[57] ABSTRACT

An electrically operated device in a subsurface well instrument and selectively fired perforating guns in the subsurface well instrument are operated using a single conductor cable. A switching means incuding a double pole, double throw latching relay allows the single conductor cable to be electrically connected to either the electrically operated device or the selectively fired perforator. Upon command from the surface, the switching means will couple the appropriate subsurface unit to the surface electronics and the subsurface unit may be actuated to perform the desired operation in the well.

8 Claims, 4 Drawing Figures

SYSTEM FOR OPERATING AN ELECTRICAL DEVICE AND A SELECTIVELY FIRED PERFORATOR UTILIZING A COMMON TRANSMISSION CHANNEL

BACKGROUND OF THE INVENTION

The present invention relates to a system for selectively operating two or more electrically operated borehole logging or treating devices using a single conductor cable.

In many well logging and treating operations, it is desirable to couple a multiplicity of elements together in order to decrease operating time and to reduce the possibility of errors in depth measurement in the borehole. For example, it is a common practice to lower a perforating device into a borehole or a well and to fire the device to make openings in the well casing and surrounding formations to allow oil to flow into the well. The perforations must be made at an accurately determined depth in the well. In order to accomplish this, a detecting device is positioned in the subsurface instrument housing to determine the proper depth for locating the perforations. The perforator is then actuated to produce the desired perforations in the well casing. In order to provide a mulitplicity of perforations in the well casing a multiplicity of perforating guns are positioned in the subsurface instrument and the perforating guns are adapted to be selectively fired so that perforations may be made in the casing at a multiplicity of depths in the borehole.

It has been found that certain types of elements coupled together on a single conductor cable are dangerous because one element can accidentally apply power to another element and cause considerable damage. For example, when a perforator and a radiation detecting system are used in combination using a single conductor cable, the power transmitted from the surface to operate the detecting system might easily trigger the perforator. It is therefore essential that a logging and treating system having a multiplicity of elements that are operated over a single conductor cable include safety features to prevent the operation of one element from interfering with the operation of other units.

An example of the use of a well logging and treating system having a multiplicity of elements that might be operated over a single conductor cable is a perforating system for use in a multiple-tubing well. The multiple-completion well is an important innovation in petroleum production technique. In such wells a plurality of parallel and, to some extent, coextensive strings of tubing are lowered into an uncased earth borehole which is subsequently filled with cement. Each tubing string is then separately perforated at different levels so that production may be obtained from a plurality of strata traversed by the borehole. Perforation of the individual tubing strings is usually accomplished by lowering a perforating gun into the tubing to be perforated, and firing a projectile or shaped charge to penetrate the tubing, the surrounding cement and the traversed geological formation. It will be readily appreciated that while in a conventional single-completion well the direction in which the perforation is fired is usually of no importance, it is quite critical in a multiple-completion well. Since in a multiple-completion well a plurality of tubing strings are closely adjacent to one another there is danger that the perforating of one of them from the inside might inadvertently perforate one or more of the others if the perforating gun happened to be aimed in that direction when discharged. Since it is desired to perforate separately each of the tubing strings adjacent different horizons, such inadvertent perforation must be avoided.

Another problem in the perforation of tubing in multiple-completion wells arises from that fact that the individual tubing members are asymmetrically surrounded by cement. Thus, there is a preferred direction of firing for an internally contained gun in order that the projectile or shaped charge may encounter the minimum thickness of cement in order to penetrate the traversed earth stratum to a maximum possible extent.

A number of perforating systems have been proposed that include selective orientation of perforating guns in multiple-completion wells whereby inadvertent perforation of more than one tubing is avoided. Such a system, for example, could include a subsurface unit adapted to be lowered into a well tubing or casing on a wireline. The unit would contain a direction finder device coupled to and rotatable together with a perforating gun, with the direction finding device including a source of relatively narrow, laterally directed beam of radiation, preferably gamma radiation, and a laterally, directionally-sensitive radiation detector unit, adapted to receive radiation resulting from scattering of the source beam radiation in the adjacent environment. Means would be provided for rotation of the direction finder device and the perforating gun together about its longitudinal axis so that an annular portion of the surrounding medium would be scanned by the source and the detector. Because of the differences in relative density, the radiation scattering pattern of adjacent tubing is distinctive from the scattering pattern of adjacent cement so that signals from the detector received at the surface of the well would indicate whether the direction finder and the aligned perforating gun are pointing toward or away from an adjacent tubing string. Since the relative density of a sector of cement scattering the radiation will vary with the thickness, the thinnest region of cement could also be located and the gun fired while pointing in that direction, thus obtaining maximum penetration into the adjacent formation. Such s system would require the operation of a wide variety of individual elements in the subsurface unit thereby increasing the problems associated with using the system with a single conductor cable.

BRIEF DESCRIPTION OF THE PRIOR ART

In U. S. Pat. No. 2,912,932 to E. D. Ayers patented Nov. 17, 1959, a device for selectively operating two electrically operated borehole logging and treating instruments through the same electrical conductor is shown. A radiation detector is connected in series with a perforating device. The radiation detector determines the proper position for the perforating device whereupon the current through the single conductor is increased to detonate the perforator. The device is constructed of a frangible material and upon detonation of the perforator, it is broken into small pieces by the explosion.

In U. S. Pat. No. 2,935,021 to J. R. Niles patented May 3, 1960, a system for selectively operating two electrically operated borehole logging or treating devices from a cable having a single insulated conductor is shown. A radiation detector and a perforating device are connected in parallel. A spark gap is connected in series with the cable and the perforating device. The radiation detector is operated at a potential which is incapable of breaking down the spark gap. When the radiation detector indicated that the device has been properly positioned, the potential on the cable is increased sufficiently to break down the spark gap and fire the perforator. Both the radiation detector and the perforating device are made of a frangible material which is broken into small pieces by the explosion of the perforating device.

In U. S. Pat. No. 2,732,518 to J. M. Bricaud patented Jan. 24, 1956, a borehole detecting circuit and borehole firing circuit utilizing a common transmission channel are shown. As electrical element having a relatively high impedance to A. C. current but a low resistance to unidirectional current is inserted between the firing circuit and the common transmitting channel. The firing circuit does not materially attenuate the signals generated in the detecting circuit. By supplying unidirectional current of proper polarity to the firing circuit through the common transmission channel, the required firing current intensity can be developed with relatively low voltage.

SUMMARY OF THE INVENTION

The present invention provides a system for operating an electrically operated unit in a subsurface instrument and for selectively firing perforator guns in the subsurface instrument using a single transmission channel. A switching means is provided in the subsurface instrument that may be operated on command from the surface for coupling either the electrically operated unit or the perforator guns to the single transmission channel. In the electrically operated unit mode the subsurface instrument may be adapted to transmit logging signals to the surface or to perform a selected operation in the well and in the perforator mode the perforator guns may be selectively fired by transmitting signals down the single transmission channel.

The above and other features and advantages of the present invention will become apparent from a consideration of the following detailed description of the invention when taken in conjunction with the accompanying drawings.

DETAILED DESCRIPTION OF THE INVENTION

Figures 1, 2:
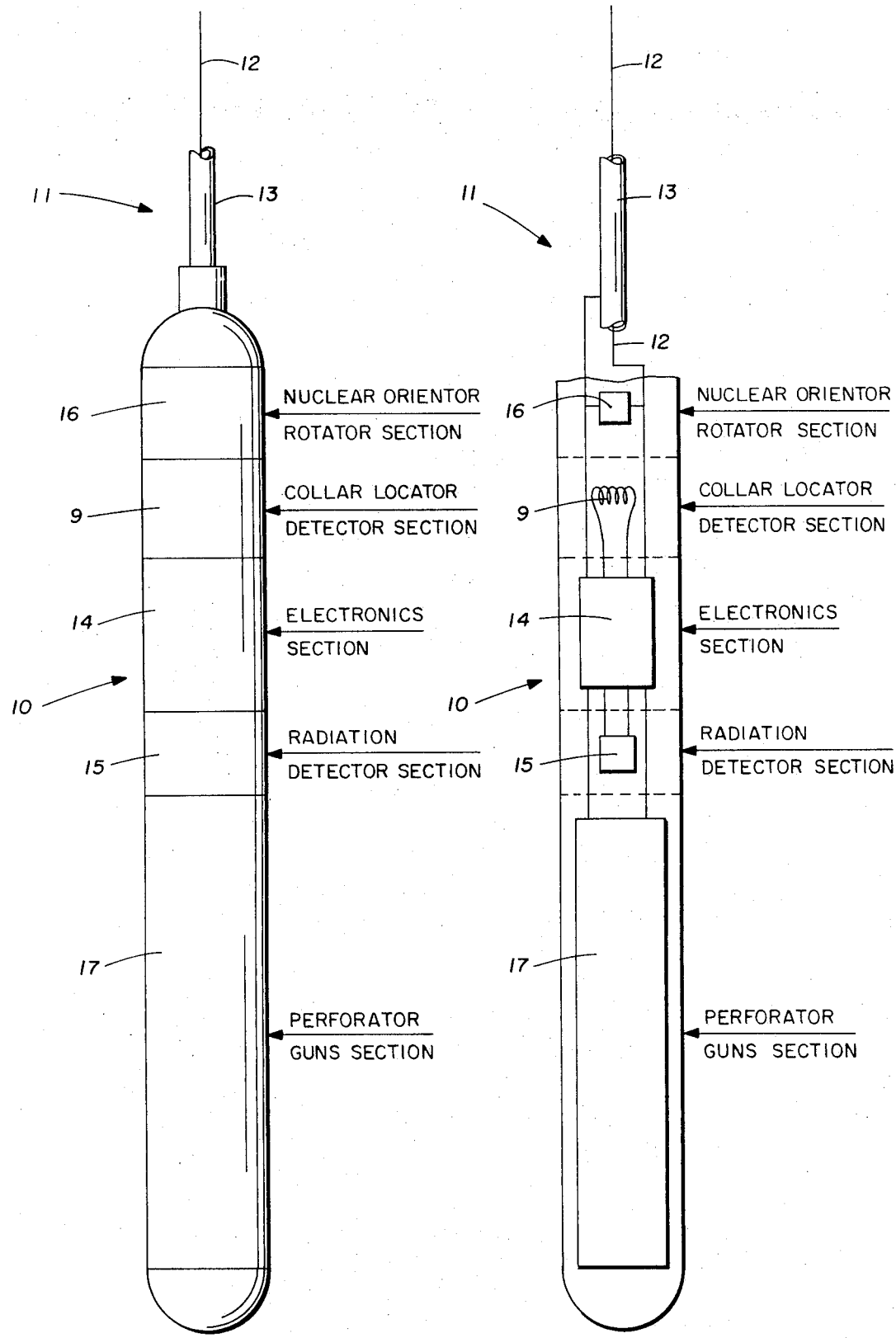
FIG. 1 is a schematic illustration of a borehole instrument constructed in accordance with the present invention.
FIG. 2 illustrates a portion of the borehole instrument of FIG. 1 with some of the elements shown in greater detail.

Referring now to the drawings and in particular to FIGS. 1 and 2, a subsurface well instrument, generally designated by the reference numeral 10, constructed in accordance with the present invention is illustrated. The well instrument 10 is in essence an elongated, cylindrical housing adapted to be supported in a well bore by cable 11. The cable 11 consists of a single, insulated electrical conductor 12 adapted to connect the well instrument 10 to the surface equipment (not shown). The cable 11 includes a sheath or armor 13 that may serve as a return path for current in conductor 12. The well instrument 10 contains an electronics section 14, a radiation detector section 15, a nuclear orientor rotator section 16, a collar locator detector 9, and a perforator guns section 17. The electronics section 14 includes a double pole, double throw latching relay system for selectively connecting either the perforator guns or the radiation detector section 15 to the surface electronics. The radiation detector 15 may include conventional gamma ray logging, neutron logging or directional nuclear orientor gamma ray detector elements. The nuclear orientor section 16 includes a motor adapted to rotate the nuclear orientor detector and the perforator guns until they are in the desired position for firing. The nuclear orientor 16 could, for example, include elements such as those shown in U. S. Pat. No. 3,426,851 to H. S. Arendt issued Feb. 11, 1969. The perforator guns section 17 contains a number of individual perforating guns that are adapted to be fired selectively by signals from the surface.

Figure 3:
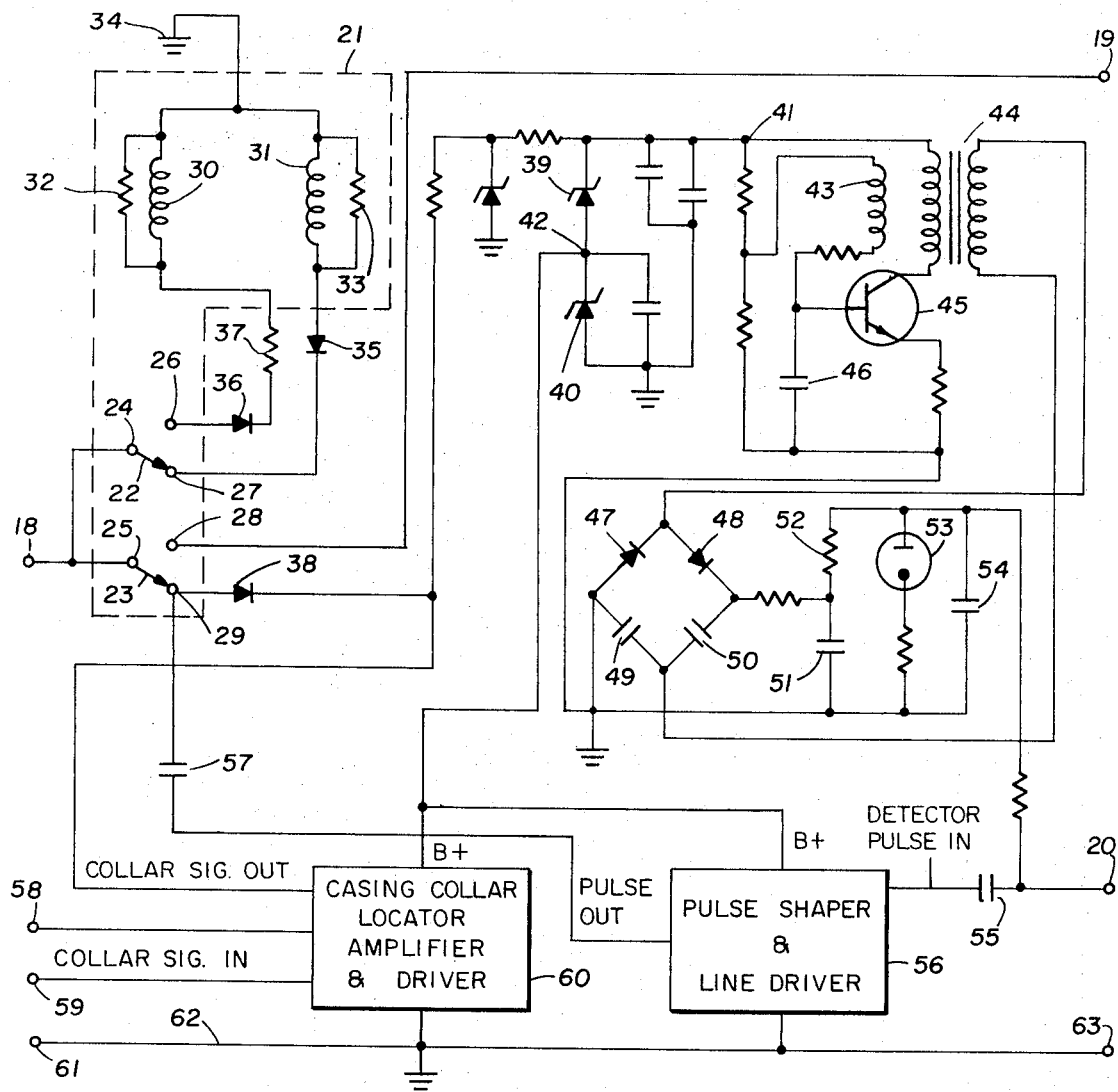
FIG. 3 is a schematic diagram of an electrical circuit from the borehole instrument shown in FIGS. 1 & 2.

Referring now to FIG. 3, the circuitry of electronics section 14 of the well instrument 10 is illustrated. The single conductor 12 of the logging and perforating system is connected to terminal 18. Terminal 19 is connected to the perforator guns section 17 located in the system's subsurface housing. The perforator guns may be selectively fired by applying alternate applications of plus and minus D. C. current along the single conductor cable. The perforator guns section 17 is constructed in accordance with systems well known in the art wherein the individual guns are selectively fired by applying plus and minus D.C. current through the cable. Terminal 20 is connected to the radiation detector section 15 located in the system's subsurface housing. The detector section 15 may include gamma ray detectors, neutron detectors or other prior art detectors.

A double pole, double throw, latching relay 21 is interposed in the circuit to move the movable taps 22 and 23 of switches 24 and 25 to selectively couple either the perforator guns section 17 or the radiation detector section 15 to the single conductor cable 11. The relay 21 operates to move the movable tap 22 of switch 24 between terminals 26 and 27 and to move the movable tap 23 of switch 25 between terminals 28 and 29. The relay 21 includes coils 30 and 31 and conventional mechanical elements for moving the movable taps 22 and 23 in tandem. A pair of resistors 32 and 33 are connected across the coils 30 and 31 respectively. The relay 21 is grounded at 34 by a suitable ground connection connected to the instrument housing. A diode 35 is connected in series with coil 31 and diode 36 and resistor 37 are connected in series with coil 30. A negative D.C. current of approximately 1 amp is required to move movable tap 22 from terminal 27 to terminal 26 and movable tap 23 from terminal 29 to terminal 28. The resistor 33 across coil 31 is a low value such as 7.5 ohms so that the D. C. current of 1 amp is necessary to switch relay 21. A positive D.C. current is required to move the movable tap 22 from terminal 26 to terminal 27 and movable tap 23 from terminal 28 to terminal 29. Register 37 is added in series with the coil 30 to insure that a higher voltage is required for the relay 21 to operate to switch the circuit into the radiation detector operate position.

The relay 21 is shown in the radiation detector operate position wherein the radiation detector and casing collar locator may be operated using the single conductor cable 11. The movable tap 23 is in contact with terminal 29. With the relay 21 in this position and with a positive D.C. voltage applied to the single conductor 12, there is a positive voltage at terminals 27 and 29 of FIG. 3. The positive D.C. current can flow through the relay 21 and through the diode 38 and on through zener diodes 39 and 40 where regulated low voltage D.C. is made available at terminals 41 and 42. The B+ voltage at terminal 41 is applied to a conventional blocking oscillator high voltage power supply including conventional elements 43, 44, 45 and 46. The output of the high voltage blocking oscillator is fed into a conventional voltage doubler circuit including conventional elements 47, 48, 49, 50 and 51. Resistor 52 controls the current flow through high voltage regulator 53. Capacitor 54 provided additional filtering for the high voltage. The high voltage is then routed to terminal 20 and to the radiation detector section 15.

The pulses coming from the radiation detector section 15 are coupled through capacitor 55 into the pulse shaper and line driver circuit 56. Circuit 56 receives its B+ voltage from terminal 42. The output pulses from the pulse shaper and line driver circuit 56 are coupled back to the single conductor 12 through capacitor 57 at relay terminal 29. The casing collar signal comes into the electronics section at terminals 58 and 59. The collar signal is amplified by casing collar locator amplifier and driver 60 and coupled back on to the single conductor line 12. The return path for current from the single conductor 12 may be through the cable sheath 13. The cable sheath 13 is electrically connected to terminal 61 of line 62 and the radiation detector section 15 may be connected to line 62 at terminal 63.

Figure 4:
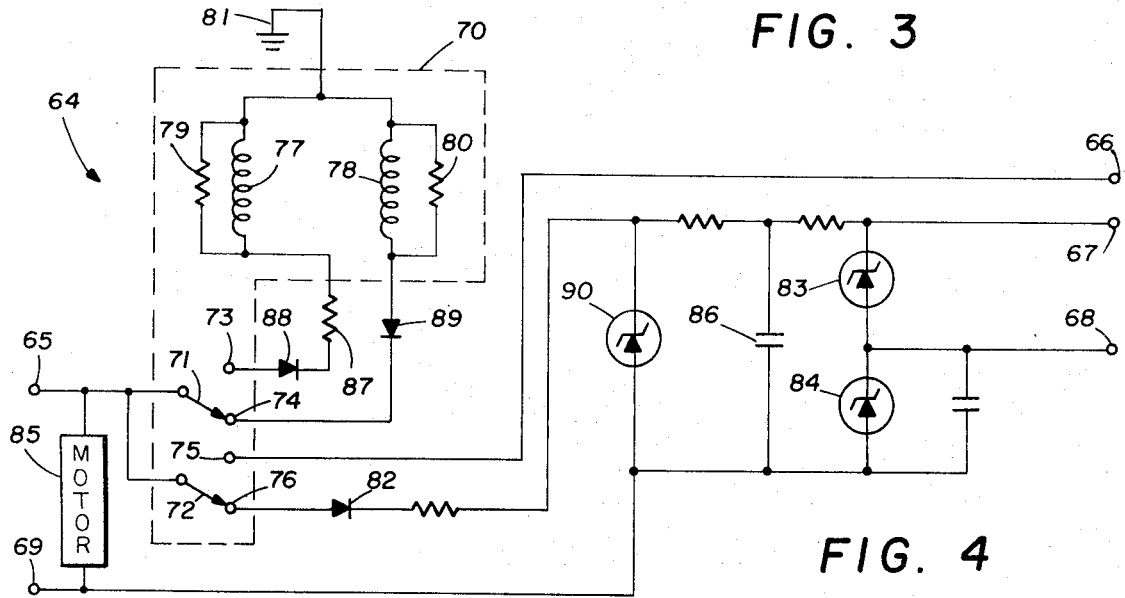
FIG. 4 is a schematic illustration of a circuit of another embodiment of the present invention.

Referring now to FIG. 4, a block diagram of an electrical switching means illustrating another embodiment of the present invention is shown and generally designated by the reference numeral 64. The terminal 65 of switching means 64 could, for example, be electrically connected to the single conductor cable of a subsurface instrument with terminal 66 connected to the perforator guns section of the instrument and the terminals 67 and 68 could be connected to an electrically operated unit in the subsurface instrument. The terminal 69 could be connected to the cable sheath or armor. The switching means 64 includes a double pole, double throw latching relay 70 interposed in the circuit to selectively couple either the perforator guns section terminal 66 or the electrically operated unit terminals 67 and 68 in the circuit from the conductor, terminal 65 to the sheath or armor terminal 69. The relay 70 will operate to move the movable taps 71 and 72 and complete the circuit by connecting movable tap 71 to either terminal 73 or 74 to connect movable tap 72 to either terminal 75 or 76. The relay 70 includes coils 77 and 78 and conventional mechanical elements for moving the movable taps 71 and 72 in tandem. A pair of resistors 79 and 80 are connected across coils 77 and 78 respectively. The relay 70 is grounded at 81 by a suitable ground connected to the subsurface instrument.

The relay 70 is shown in the electrically operated unit operate position. In this position, a positive D.C. current down the single conductor cable will pass through diode 82 and the positive voltage for the electronics at terminals 67 and 68 will be regulated by zener diodes 83 and 84. The nuclear orientor is operated by applying an alternating current voltage to the single conductor cable through terminal 65, terminal 69 and the cable sheath. This A. C. voltage will energize A. C. motor 85 in order to position the perforator guns at the desired position for firing. Capacitor 86 is 200 microfarads or more which will keep the 60 H A. C. current out of the radiation detectors in the electrically operated unit. The surface electronics (not shown) for this system has a 60 cycle filter to prevent the A. C. voltage from effecting the signal from the radiation detectors.

To switch the system from the position that is shown to the perforator guns operate position, a negative D. C. current of approximately one (1) amp is sent down the single conductor cable. Resistor 80 across the relay coil 78 is a low value, such as 7.5 ohms so that the D. C. current of one (1) amp will switch the relay 70. The movable taps 71 an 72 will then be moved into contact with terminals 73 and 75 respectively. The single conductor cable will be connected to the perforator guns section through terminal 66. The perforator guns can now be selectively fired by switching back and forth between negative and positive D. C. current. The gun firing current should not exceed 0.75 amps to make sure that the relay 70 is not switched back to the electrically operated unit operate position. The blasting caps that are used in the perforator guns should be selected to actuate on a firing current of 0.5 amps. A resistor 87 is added in series with relay 70 so that a higher voltage is required for the relay 70 to switch into the electrically operated unit operate position. The diodes 88 and 89 route the positive and negative switching current so that relay 70 can be switched back and forth from the electrically operated unit to the perforator guns. Zener diode 90 across the input to the electrically operated unit protects the electronics from the voltage surge that develops when the relay 70 switches to the electrically operated unit operate position. When the relay 70 switches, the current will drop from one amp or more to less than 0.2 amps.

The embodiments of an invention in which an exclusive property or privilege is claimed are defined as follows:

1. A system for determining at least one characteristic of a well and for selectively perforating the well at a multiplicity of locations using a single transmission channel, comprising:
   a well instrument housing,
   selectively fired perforator means positioned in said housing for perforating said well at a multiplicity of locations,
   detector means positioned in said instrument housing for determining at least one characteristic of said well, and
   switching means positioned in said housing for selectively connecting said perforator means or said detector means to said common transmission channel.

2. The system of claim 1 wherein said switching means includes a double pole, double throw latching relay.

3. The system of claim 2 including nuclear orientor means positioned in said housing and connected to said single transmission channel for positioning said perforator means in a proper position for firing.

4. The system of claim 3 wherein said nuclear orientor means includes an A. C. motor.

5. The system of claim 4 wherein said detector means includes a radiation detector.

6. The system of claim 5 wherein said detector means includes a casing collar locator.

7. The system of claim 6 wherein said double pole, double throw latching relay includes a pair of coils adapted to form alternate circuits with a switch adapted to convert one of said alternate circuits to said single transmission channel.

8. The system of claim 7 including a diode in each of said alternate circuits and a resistor in one of said circuits.

* * * * *